(12) United States Patent
Julliard et al.

(10) Patent No.: US 6,816,536 B2
(45) Date of Patent: Nov. 9, 2004

(54) METHOD AND APPARATUS FOR IN SITU PROTECTION OF SENSITIVE OPTICAL MATERIALS

(75) Inventors: Karin Julliard, Sunnyvale, CA (US); Steve Utter, Livermore, CA (US); Alan B. Petersen, Palo Alto, CA (US)

(73) Assignee: Spectra Physics, Inc., Mountain View, CA (US)

( * ) Notice: Subject to any disclaimer, the term of this patent is extended or adjusted under 35 U.S.C. 154(b) by 0 days.

(21) Appl. No.: 10/006,997

(22) Filed: Nov. 30, 2001

(65) Prior Publication Data

US 2003/0103545 A1 Jun. 5, 2003

(51) Int. Cl.⁷ ................................................ H01S 3/00
(52) U.S. Cl. ........................ 372/109; 372/33; 372/59
(58) Field of Search ............................ 372/109, 33, 55

(56) References Cited

U.S. PATENT DOCUMENTS

| | | | | |
|---|---|---|---|---|
| 5,550,851 A | * | 8/1996 | Guch et al. ................. 372/33 |
| 5,862,163 A | * | 1/1999 | Umezu et al. ............... 372/21 |
| 5,990,377 A | * | 11/1999 | Chen et al. ................. 604/381 |
| 6,034,775 A | * | 3/2000 | McFarland et al. .......... 356/364 |
| 6,036,321 A | | 3/2000 | Wright et al. ............... 359/513 |
| 6,087,952 A | * | 7/2000 | Prabhakaran ............. 340/693.5 |
| 6,170,167 B1 | | 1/2001 | Kato ............................. 34/80 |
| 2001/0006610 A1 | * | 7/2001 | Miller et al. ................ 422/129 |
| 2001/0028670 A1 | * | 10/2001 | Tamura et al. ................ 372/55 |

FOREIGN PATENT DOCUMENTS

| | | | |
|---|---|---|---|
| GB | 437139 | 10/1935 | ............... 22820/34 |
| JP | 07270627 | 10/1995 | ............. G02B/6/00 |

* cited by examiner

*Primary Examiner*—Wilson Lee
*Assistant Examiner*—Dung Nguyen
(74) *Attorney, Agent, or Firm*—Heller Ehrman White & McAuliffe LLP

(57) ABSTRACT

A method and apparatus are provided for in situ protection of sensitive optical materials from alternation or damage due to exposure to trace atmospheric components, during shipping, storage or operation. The sensitive optical material is disposed within an enclosure adaptable to be substantially sealed against the external atmosphere. A container, enclosing a sink material absorbing trace atmospheric components, is coupled to the enclosure by a gas permeable surface, which allows fast diffusion of the trace atmospheric component inside the enclosure to the sink material.

59 Claims, 6 Drawing Sheets

PERSPECTIVE 200

TOP 210

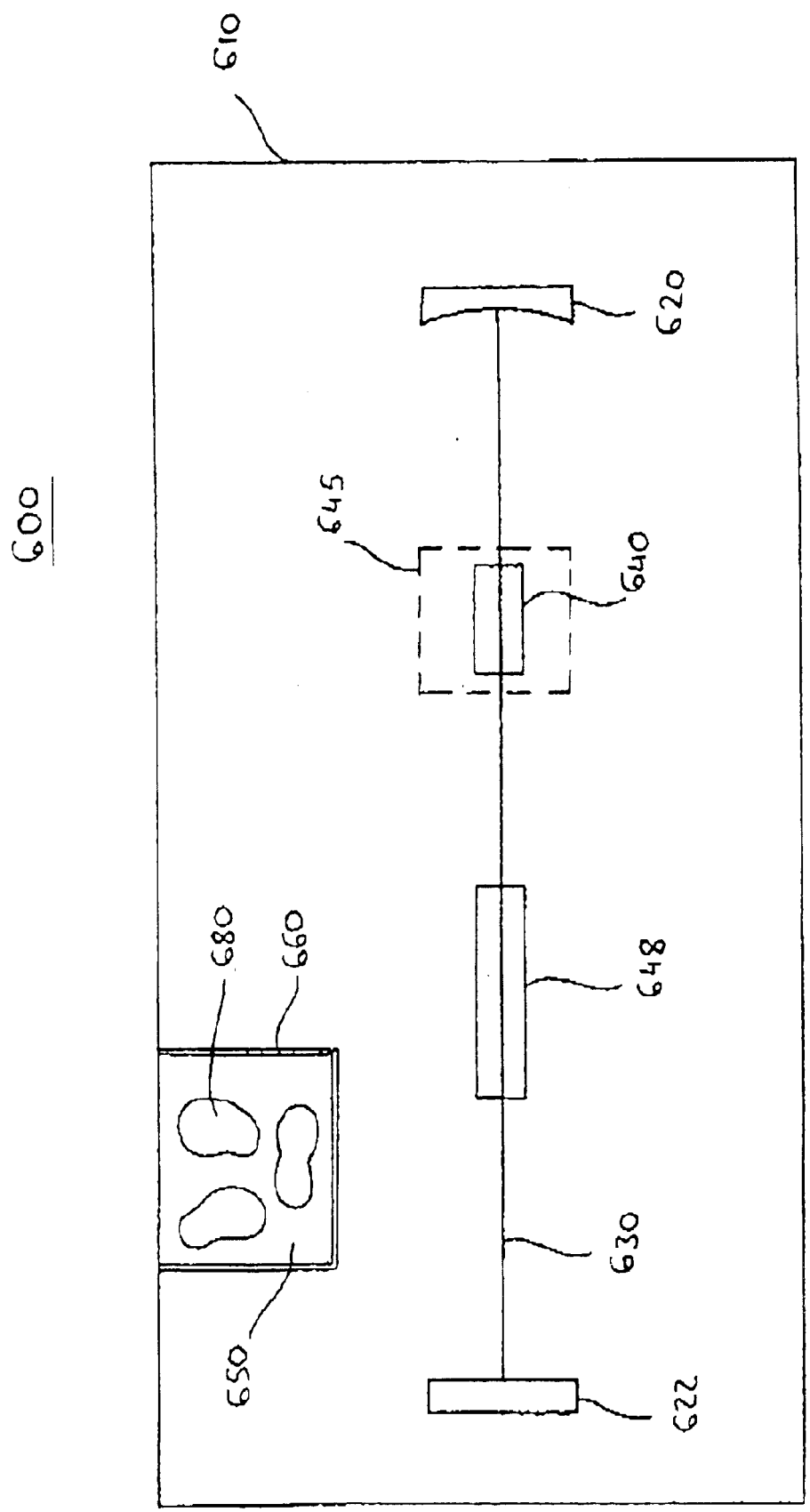

METHOD AND APPARATUS FOR IN SITU PROTECTION OF SENSITIVE OPTICAL MATERIALS

BACKGROUND

1. Field of the Invention

This invention relates generally to the fields of optics and lasers, and more particularly to protecting sensitive optical elements from alteration or damage due to exposure to trace atmospheric species during shipping, storage or use.

2. Description of the Related Art

Many optics and laser systems employ sensitive optical materials that may be damaged by exposure to trace elements or components in the surrounding environment. In particular, certain materials that are of great interest because of their unique optical properties are prone to interact with a surrounding atmosphere to an extent that is sufficient to change the material's physical structure, resulting in subsequent degradations in the material's performance. This presents a problem for in situ protection of these materials in both everyday use, shipping and storage. For some materials, even ambient levels of water vapor of a few percent by mass may pose a threat, while for other materials, certain chemical species in the surrounding environment such as organic molecules may be an issue.

Borate crystals are an example of one class of materials that may suffer deterioration in performance upon mere exposure to ambient environment, such as air. This is because the crystals are hygroscopic, and can chemically react with absorbed water molecules. Such reactions can cause undesirable alterations in the crystals' optical and physical properties. Examples of borate crystals include BBO ($\beta$-$BaB_2O_4$), LBO ($LiB_3O_4$) and CLBO ($CsLiB_6O_{10}$), all of which found considerable use in the nonlinear conversion of light from infrared and visible lasers into the UV spectral range. These crystals differ by their optical and physical properties including the degree to which they are innately prone to absorbing water vapor from a surrounding environment. Among these crystals, CLBO has become the crystal of choice for harmonic conversion to wavelengths shorter than 300 nm because of fortuitous combination of optical properties and nonlinear parameters. It is currently considered to be the most suitable material for fourth and fifth harmonic generation of laser light from infrared Nd-doped lasers at high powers. CLBO is however, also particularly hygroscopic. The literature on the deleterious effects of moisture on CLBO includes the article by Taguchi et al in Advanced Solid State Lasers, C. R. Pollock and W. R. Bosenberg, eds. OSA Vol. 10, pp.19 (1997), where correlations were described between the rate of surface hydration and induced cracking and refractive index changes. Such humidity dependent characteristics are generally considered to be highly detrimental to reliable and long term use and operation of CLBO in high power laser systems.

Other examples of known hygroscopic crystals are the so-called ADP-isomorphs, such as $KD_2PO_4$ (KD*P), $NH_4D_2PO\$$ (AD*P) and $CsD_2AsO_4$(CD*A). These crystals are commonly used in electro-optic light modulators or in non-linear frequency conversion. Among this class of materials, CD*A is known to be particularly sensitive to humidity levels.

Several techniques have been employed to protect strongly hygroscopic materials such as CLBO, CD*A and the like, from the deleterious effects associated with water vapor absorption. They include special coatings, hermetic sealing with gas purging and operation at elevated temperatures.

Anti-reflective coatings are traditionally applied to crystalline materials used in laser systems to prevent Fresnel losses. Yet, coatings are also useful as a barrier to prevent water vapor or oxygen molecules from permeating the crystal, and causing disadvantageous changes in the physical structure and attendant thermal and optical properties thereof. Use of protective films on crystals subjected to UV radiation was described, for example, in U.S. Pat. No. 5,862,163. Such coatings were useful for crystals such as BBO, which is not highly hygroscopic or reactive. Coatings have proven more problematic for more reactive crystals such as CD*A and CLBO, because the process of applying the coatings can itself precipitate further damage mechanisms at the interface between the crystal and the coatings. Furthermore, coatings become increasingly susceptible to damage as the wavelength of the light becomes shorter, an acute problem for CLBO which is most often used to convert light into the deep UV. For highly sensitive materials, in particular, there is often a negative trade-off between the requirement that the film be thick enough to prevent water permeability, yet be thin enough to avoid damage. Thus, in and of themselves, coatings may not be sufficient to provide the needed protection from moisture and other potentially harmful gas species.

Another protective measure involves use of clean room preparation and assembly techniques to seal the enclosure containing the sensitive material followed by purging with a high purity gas that is inert with respect to chemical interactions that may change the material's physical or optical properties. Such sealing and purging methods using most commonly Nitrogen or an inert element as a purge gas, are well known in the art of laser fabrication, assembly and maintenance, and purging is often used as a standard procedure for example, during field service, following the replacement or repair of optical elements contained within the laser. However, when the optical element is extremely fragile and is especially sensitive to contamination even by trace gas components, special precautions must be taken to provide sufficient protection against ambient environment. For example, the cell containing the material may be hermetically sealed, to prevent any potential for leakage or contamination, in which case a single charge of gas can be used. Alternatively, the purge gas may flow continuously or at intermittent intervals, in which case the chamber containing the material must still be tightly sealed against the external environment, and a complete gas pumping and purification system must be further provided as part of the assembly, with a ready supply of purge gas maintained at all times.

While effective in providing a degree of protection against contamination, techniques of purging and tight sealing present a number of significant practical disadvantages. In particular, tight, or, in the extreme case, hermetic sealing of the chamber does not allow for any ready access to the optical material for the purposes of adjustment, inspection or replacement. In addition, if windows that are transparent to deep UV light must be provided as part of the sealed cell, as is the case for example, for CLBO used in a harmonic conversion module, there is a substantial risk of damage to the window material, especially at higher powers. Combined with the limited accessibility, the need to design so as to avoid damage to windows limits the design flexibility of the entire system containing the material.

Complete gas sealing also has the complication that altitude or other atmospheric changes as may be encountered during shipping can produce undesirable forces on the mechanical system containing the cell, leading to potential misalignments which are not readily corrected. Considerable cost, bulk and complexity are also added to the system, whether a hermetically sealed cell is utilized or a complete purge system is included, even as the overall reliability and longevity of the entire system may be compromised by a potential for catastrophic failure should the purge unexpectedly fail, or the gas charge dissipate. This failure mode is especially problematic when shipping a device in which CLBO or a similarly sensitive material is a component. By land, sea or air, practicality demands that devices be unattended for extended times.

Whenever the purge is not operating, or and/or the tight sealing is compromised due, for example, to extreme temperature and pressure variations, the crystal may be left insufficiently protected and may become momentarily exposed to undesirable humidity or other contaminant levels. Should irreversible damage occur to the sensitive material in the field, the entire sealed cell or chamber assembly must be replaced, thereby increasing the life cycle costs of the system.

In the case of CLBO it was shown that temperature annealing of the crystal and operation at elevated temperatures can significantly reduce index distortion and other optical damage effects. It is customary to place the CLBO or similar sensitive material in an oven. The oven mitigates against absorption of gas species because the heated material acts very rapidly to eliminate condensation by thermalizing any contaminant gas molecules that are adsorbed on the material's surface. When contaminant molecules comprise water vapor, maintaining the crystal at elevated, constant temperature can reduce surface hydration and subsequent physical alterations. Practical implementation of this technique requires avoidance of heating and cooling cycles, necessitating continuous operation of the oven surrounding the sensitive material, even during storage and transportation.

Techniques for controlling the temperature of a nonlinear crystal are disclosed in U.S. Pat. No. 6,002,697, where provisions are included for purging a tightly or hermetically sealed housing containing the crystal so as to remove any moisture from the surrounding environment. This method requires a continuous actively controlled thermal and physical environment, as the oven(s) have to be continually supplied with power, and a complete purge assembly must also be provided as was described above. Electrical power is typically provided by bulky, heavy batteries or by access to an existing electrical grid. During shipping, there is lack of access to the electrical grid whereas the bulk and weight of batteries as well as security issues can be problematic. Thus, failure of either the power supply and/or the purge system can have catastrophic effect on the crystal.

Solutions to the problem of in situ protection of contamination-sensitive optical materials are therefore desired that involve methods that do not inherently require exchanging mass with an external source (purging) to establish a uniform steady state with respect to chemical composition, or exchanging energy to establish a non-uniform steady state with respect to temperature (heating) within the enclosure. The related art suggests one passive technique described in U.S. Pat. No. 6,036,321 which teaches use of a desiccant material to absorb water vapor from a surrounding environment, thereby protecting the hygroscopic material. The specific teaching involves coupling a desiccant container to a volume containing the hygroscopic material with a tube or a duct.

While such a structural arrangement has the dual advantages of i) isolating the hygroscopic material from any potentially deleterious effects of exposure to the desiccant (for example, out-gassing or aerosol generation); and ii) isolating the desiccant from any potential damage from radiation that may illuminate the volume containing the hygroscopic material, the tube/duct inherently restricts the flux of contaminants. It is therefore applicable to comparatively less hygroscopic materials such as LBO, KDP and KD*P. While water molecules will eventually diffuse into the volume containing the desiccant, resulting in moisture reduction, the time required to remove all traces of water vapor from volume surrounding the crystal may be too long for comparatively sensitive materials like CLBO or CD*A, especially during shipping when temperature and pressure can vary rapidly over a wide range.

There is therefore a need for a passive method and apparatus for protecting sensitive materials that is compatible with rapid removal of trace components such as water from the surrounding ambient environment. There is a further need for a method and apparatus for protecting sensitive materials that can accommodate materials with different rates of absorption even under conditions that include wide temperature and pressure extremes.

SUMMARY

Accordingly, an object of the present invention is to provide a passive method and apparatus for in situ protection of sensitive optical materials.

Another object of the present invention is to provide a method and apparatus for in situ protection of optical materials that is compatible with rapid removal of trace components such as water from the surrounding ambient environment.

A further object of the present invention is to provide a method and apparatus for in situ protection of optical materials that can accommodate materials with different rates of absorption over wide temperature and pressure ranges.

These and other objects of the present invention are provided in an optics housing with an enclosure that has an interior volume and is configured to be substantially sealed against an external atmosphere. An optical element is positioned in the interior volume. The optical element includes a material having at least one physical characteristic that varies with exposure to at least one constituent of the external atmosphere. A container is coupled to the housing and includes a gas-permeable surface. A sink material is disposed within the container. The sink material sorbs at least one gas species.

In another embodiment of the present invention, an optics housing includes an enclosure with an interior volume. The enclosure is adaptable to be substantially sealed against an external atmosphere. An optical element is disposed within the interior volume. The optical element contains material with at least one physical characteristic that varies with exposure to at least one constituent of the external atmosphere. A container is coupled to the enclosure. The container includes a gas-permeable surface area with a ratio of no less than 0.1 to a surface of the container. A sink material is disposed within the container. The sink material has a characteristic of spontaneously sorbing at least one gas species.

In another embodiment of the present invention, an optics housing includes an enclosure with an interior volume area. The enclosure is adaptable to be substantially seals against an external atmosphere. An optical element is disposed within the interior volume. The optical element contains material having at least one physical characteristic that varies with exposure to at least one constituent of the external atmosphere. A container is coupled to the housing and has a gas-permeable surface and a gas impermeable access port. At least a portion of the container forms a protuberance that extends into the interior volume of the housing. The gas impermeable access port is a portion of an optics housing exterior. A sink material is disposed within the container. The sink material has a characteristic of sorbing at least one gas species.

In another embodiment of the present invention, a laser system includes an enclosure with and interior volume and an interior surface area. The enclosure is adaptable to be substantially sealed against an external atmosphere. A laser is position in the interior volume. An optical element is disposed within the interior volume. The optical element contains material with at least one physical characteristic that varies with exposure to at least one constituent of the external atmosphere. A sink material is position on the interior volume. The sink material has a characteristic of spontaneously absorbing of at least one gas species.

In another embodiment of the present invention, an optics housing an enclosure with an interior volume and an interior surface area. The enclosure is configured to be substantially sealed against an external atmosphere. An optical element is disposed within the interior volume. The optical element contains material having at least one physical characteristic that varies with exposure to at least one constituent of the external atmosphere. A sink material is positioned in the interior volume. The sink material has a characteristic of spontaneously absorbing of at least one gas species.

In another embodiment of the present invention, a laser system includes an enclosure with an interior volume and an interior surface area. The enclosure is adaptable to be substantially sealed against an external atmosphere. A laser is positioned in the interior volume. An optical element is disposed within the interior volume. The optical element contains material with at least one physical characteristic that varies with exposure to at least one constituent of the external atmosphere. A sink material is positioned in the interior volume. The sink material has a characteristic of spontaneously absorbing of at least one gas species.

In another embodiment of the present invention, a method for protecting sensitive optical elements in situ provides an enclosure with an interior volume. The enclosure is adaptable to be substantially sealed against an external atmosphere. An optical element is disposed within the interior volume. The optical element includes material having at least one physical or optical characteristic that varies with exposure to at least one constituent of the external atmosphere. A sink material is provided and coupled to the enclosure. At least one gas species is trapped in the sink material by a sorption process. The at least one gas species includes at least one constituent of the external atmosphere with which the at least one physical or optical characteristic of the optical element varies.

BRIEF DESCRIPTION OF THE DRAWINGS

FIG. 6 is a schematic illustration of an enclosure containing a laser which comprises at least an active gain element, a light modulator and coupling optics.

DETAILED DESCRIPTION

Figure 1:
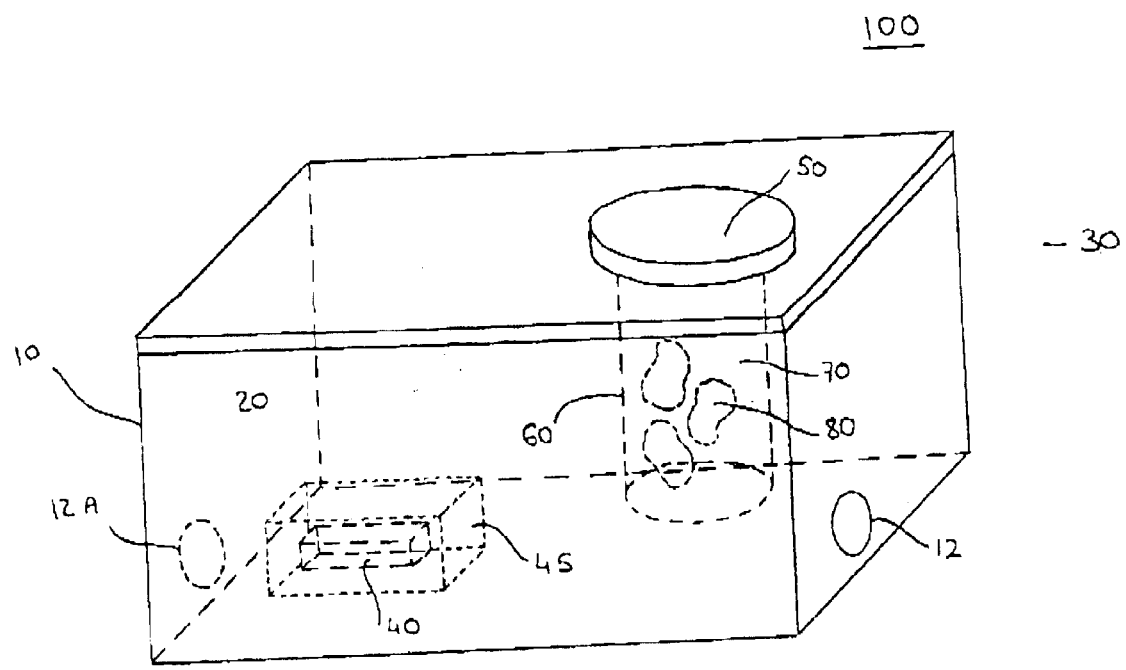
FIG. 1 is a perspective view of one embodiment of an optics housing of the present invention.

FIG. 1 illustrates an embodiment of an optic housing 100 containing a sensitive optical element 40 disposed within enclosure 10, defining an interior volume 20, and adaptable to be substantially sealed against external atmosphere 30. Also shown in FIG. 1 are container 50 containing sink material 80. The container 50 has gas-permeable surface 60, which preferably comprises most of the available surface in contact with the interior volume 20 of the enclosure 10. According to the embodiment of FIG. 1, the container 50 is coupled to the housing so to form a protuberance 70 that extends into interior volume 20. The seal separating interior volume 20 from external atmosphere 30 may be effective against both positive and negative (gauge) pressure preferably using elastometer seals, but a pressure tight seal is not necessary. The enclosure may be substantially sealed, for example, by virtue of the standard machining tolerances of parts fastened together by bolts or other means. This type of seal, while not pressure tight, is sufficient to prevent saturation of sink material 80 by extended exposure to the external atmosphere. In addition, windows 12 and 12A may be provided on opposite sides of the enclosure through which light it one or more wavelength may enter. For example, if the housing 100 comprises harmonic generation module light at one wavelength may enter through port 12 transparent to that wavelength, and upon passage through the element 40 be convert into light at a second, usually shorter wavelength, prior to exiting through window 12A, which is therefore selected and configured to be transparent at least at that second wavelength. More complex enclosures, including additional ports and windows sealed into the walls of the enclosure all fall under the scope of the present invention.

Optical element 40 includes material that has at least one physical property or characteristic that varies with exposure to a constituent of the external atmosphere 30. Typically, the optical element includes non-linear materials such as CLBO, CD*A, LBO, BBO, KDP, KD*P, or $LiNbO_3$ that may be commonly used in harmonic generation or laser light modulation. The external atmosphere in most cases is air but it may also be another mixture of gasses. For many materials of interest, for example CLBO, the material is hygroscopic and a physical property varies with exposure to water vapor. However, other or the same materials may be sensitive to a broader class of atomic or molecular species, for example organic compounds.

The element 40 may be held in a cell 45, which in some of the preferred embodiments comprises an oven or a heater, designed to maintain the temperature of the crystal or optical element 40 at a constant temperature. Such ovens designed to maintain the temperature of an optical element within prescribed limits are well known in the art of laser design and fabrication. For example, many nonlinear crystals used in harmonic conversion of fundamental laser radiation require that the temperature of the crystal be precisely controlled in order to optimize phase matching conditions.

In other examples known in the art, cell 45 encases a non-linear crystal configured as an electro- or acousto-optic modulator and used to Q-switch laser radiation to thereby obtain short laser pulses.

In either case, cell 45 includes optical windows (not shown) transparent for input and output radiation.

Element 40 may also comprise a passive coated or uncoated optical compound that may or may not be contained in cell 45. Compounds such as $CaF_2$ and $Mg\ F_2$, commonly used as substrates for various optical elements, are known to be mildly hygroscopic and can benefit from the novel features disclosed in this invention.

The container has a gas-permeable surface 60 and sink material 80 located within the container behind the gas-permeable surface. Extending into the interior volume, the protuberance places the gas permeable surface in a position to intersect with the random motion of atmospheric constituents (molecules or atoms) in a shorter time than if, in comparison, the container was coupled to the interior volume by a tube, pipe or other elongated constriction. Thus, the structure shown in FIG. 1 greatly reduces the time to remove undesirable atmospheric constituents or other contaminants to a safe level as compared to other structural relationships. This feature greatly enhances the protection afforded against unexpected leaks or other environmental changes during shipment.

It should further be appreciated that gas permeable surface 60 is substantial relative to a total surface area of the container. In combination with a more advantageous structural placement, presenting a relatively large area to the contaminant flux further improves the speed of atmospheric species and/or contaminant removal. Preferably, a ratio of the gas permeable surface to the total surface area of the container is no less than about 0.1. Typical embodiments incorporate a perforated metal or non-metallic surface or a metal or non-metallic weave, including woven mesh, or a porous surface. In particular embodiments, for example including a gas permeable surface that is similar to a thin sheet, the ratio of the gas permeable surface to the total surface area of the container approaches unity.

Sink material 80 is disposed within container 50, behind gas permeable surface 60. While the object of the sink material's presence is to protect optical element 40, typical embodiments include structures that protect the optical element from harmful collateral effects due to the sink material. Typical sink materials include desiccants such as molecular sieve, silica gel, Drierite, Zeolite and Natrasorb™ as well as other sink materials such as activated charcoal and activated allumina. For ready reference on the state-of-the-art desiccant materials one may consult data sheets, tutorials and manuals available from ZEOCHEM, all of which are incorporated by reference herein.

It is noted however, that the sink materials themselves, may be a source of harmful vapors by out-gassing or other mechanisms or may be a source of harmful aerosols (small particulates of liquid or solid material). To mitigate possible collateral damage arising from any effect of the sink material as a source, embodiments of the invention further confine the sink material in at least one sub-container. The sub-container may be a cylinder or a bag. Many variations are apparent. A preferred embodiment is at least one bag made of woven mesh material such as Tyvek™.

Many embodiments of optics housing 100 are used in a manner in which optical radiation illuminates some or all of interior volume 20. For example, a laser beam may enter the optics housing in the case where the optics housing includes one or more harmonic generator crystals, optical parametric converters or another laser module. Other embodiments, such as those tailored for shipping purposes only,may be used in a manner isolated from any incident laser beams. However, when optical radiation illuminates at least a portion of the interior volume, the same structure that affords access to gas flux exposes the sink material or sub-container material to photon flux. Over time, the optical energy density (energy/unit area) may be sufficient to degrade the sink material or sub-container material, or cause those materials to collaterally damage optical element 40. Therefore, in such embodiments, the gas permeable surface is preferably made of material that is opaque to any optical radiation that may be present in the enclosure, so that the sink material is shielded from incident optical power and/or energy density. Preferred embodiments of the opaque sub-container material include a woven mesh material, preferably having a mesh pore dimension on the order of one micrometer.

Generally, the container may be placed freely within the enclosure, but particular optical materials or operating conditions may impose constraints. To satisfy specialized constraints, preferred embodiments place the container such that there is a minimal separation distance between the container and the optical element, thereby maximizing the effectiveness of contaminant, moisture or any other harmful atmospheric species removal from the sensitive material 40.

Figure 2:
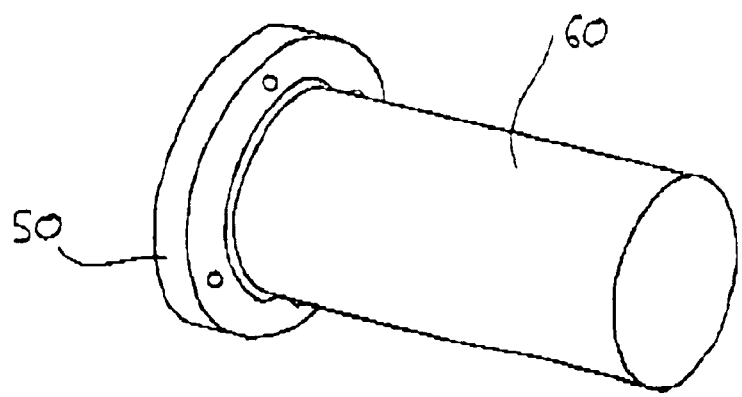
FIG. 2 is a close-up perspective view of the FIG. 1 container.
Figure 2:
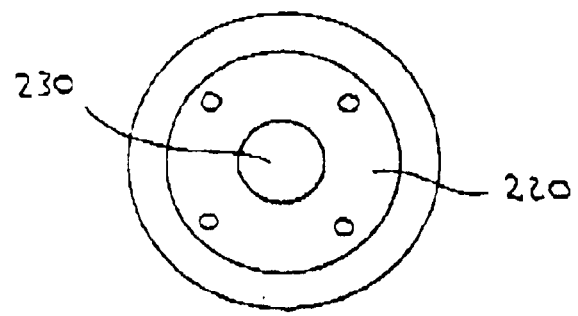

FIG. 2 illustrates detail of one embodiment of container 50. Many other variants are possible within the scope of the invention. In FIG. 2, perspective view 200, top view 210, gas-permeable surface 60, access port 220 and observation window 230 are shown. Many embodiments of the apparatus include access port 220 to the container interior. Preferably, the access port is gas-impermeable. When an access port is included, sink material may be inserted, removed, or replaced with minimal impact on the contents of optics housing 10 (see FIG. 1). In embodiments where the optics housing is used in combination with a laser, a user may remove sink material prior to laser operation. In other embodiments that include ovens surrounding optical element 40 (see FIG. 1), heating of the sensitive optical element may afford sufficient against atmospheric attack. Therefore, during operation, the oven may be used instead of sink material once reliable electrical power is established. Embodiments of this invention are seen as readily adaptable to be used in combination or as a ready alternative to techniques taught in the related art. In particular, they can provide smooth, trouble-free capability for switching back and forth between operational, stand-by and storage of the element, while maintaining a degree of accessibility desired for field maintenance or replacement operations.

A preferred embodiment of access port 220 also includes observation window 230. Some embodiments of the observation window include a spectral filter to prevent possible eye damage to a user due to laser light emanating from the observation window. The spectral filter may have a broad or narrow bandwidth, depending on the optical frequencies illuminating the interior of the enclosure.

Figure 3:
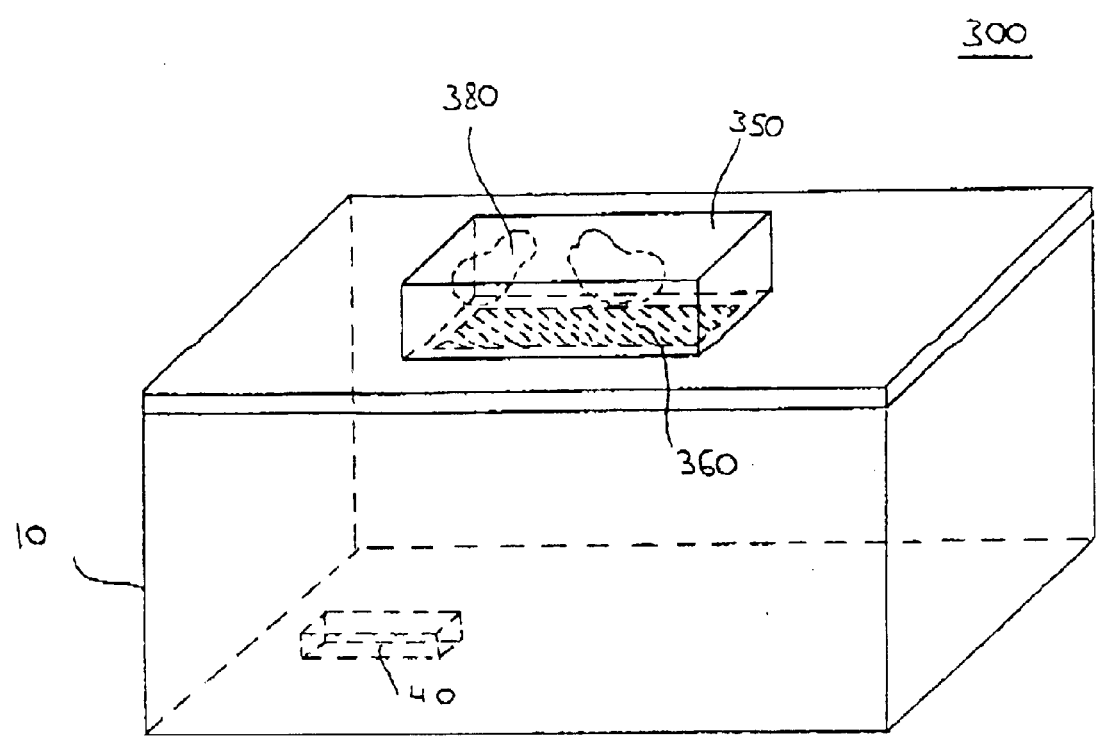
FIG. 3 is a perspective view of another embodiment of an optics housing of the present invention.

FIG. 3 represents a perspective view of another embodiment of an optics housing 300, wherein the sink material 380 is located in a container 350 that is external to enclosure 10. In this embodiment, the gas permeable surface 360 couples the container and the sink material therein to enclosure 10.

The key object of the method and related apparatus disclosed in the present invention arrangement is to allow lowering the concentration of trace atmospheric component down to a very low level in a very short time, and to maintain this low level even in case of large pressure and temperature variations. As discussed above preferred arrangement are constructed according to the principles of the invention so as to minimize dusting and out-gassing from the sink material. In addition, the container can be adapted so as to present a gas impermeable access port, accessible from outside the enclosure, allowing to insert and remove easily the sink material. By using a gas permeable coupling surface that is opaque to light, the sink material present inside the container can also be completely shielded against light. The resulting system provides a cost effective means for passively protecting sensitive materials therefore improving the lifetime and reliability of systems containing said materials.

Figure 4:
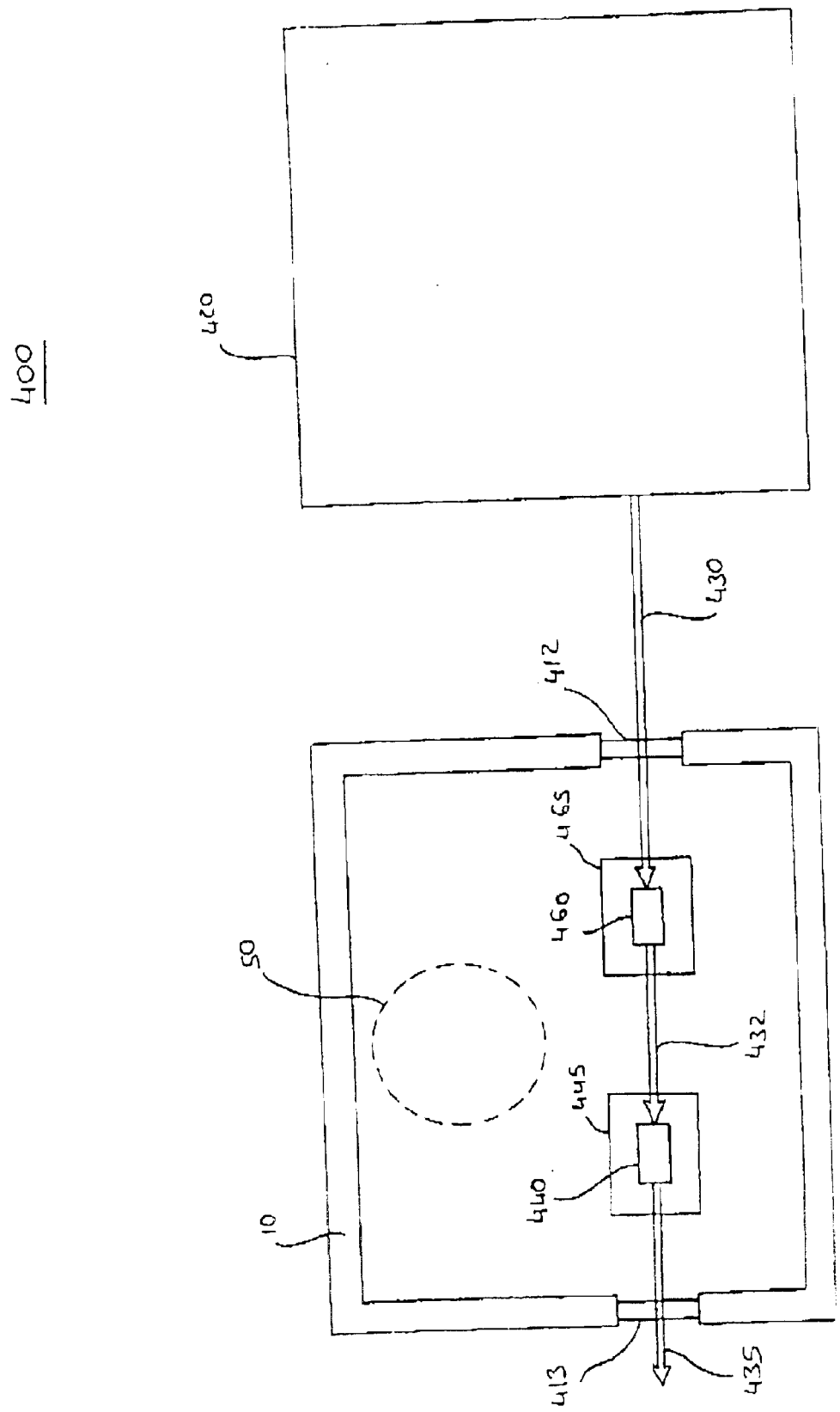
FIG. 4 illustrates an embodiment of a laser system of the present invention that includes a laser and frequency conversion modules which can include one or more hygroscopic crystals.

Exemplifying the benefits that may be derived from the present invention, there is shown in FIG. 4 a laser system 400 which includes the laser 420 and housing 10. In FIG. 4, a laser system 400, comprising laser 420, optics housing 100 including enclosure 10 (see FIG. 1), container 50 (see FIG. 1), input beam 430 and output beam 435 are shown. Other embodiments may incorporate the optics housing or the container into the laser itself. According to the invention, an input beam from the laser enters into optics housing 100 through transparent window 412, (see FIG. 1), and optical radiation is emitted as output 435 through transparent window 413. In one class of embodiments, the laser system generates ultraviolet radiation, for example by quadrupling or quintupling the frequency of an infrared laser. In correspondence to a frequency quadrupling module, there is shown a frequency doubler crystal 460 contained in cell 465, with the frequency doubled radiation 432 incident upon second crystal 440 contained in second cell 445. This embodiment is representative of laser systems generating 266 nm light using LBO for the frequency doubler and the highly hygroscopic CLBO as the frequency quadrupling material.

It should be noted that under certain conditions, and especially where deep UV radiation is present, the sink material may be selected to promote catalytic decomposition of deleterious species produced by interaction with the laser light. An example of such a situation is the production of ozone by UV light.

In other embodiments, the laser system generates radiation that overlaps in wavelength with transitions contained in electronic or rotation-vibration spectra of gas species. In such embodiments, the contaminant sink serves an additional or alternative purpose of absorbing gas species from within an interior volume 20 that interact with the laser radiation (see FIG. 1). Particular embodiments include desiccant sink material and a laser that generates radiation that is strongly absorbed in water.

Some embodiments include an oven to heat an optical element for purposes unrelated to protecting the optical element from contamination. For example, heating a nonlinear crystal may improve its resistance to optical damage. In such applications, collateral effects on the optical element due to the sink material's interaction with light or heat, or the sink material's out-gassing or desorbtion may make it preferable to remove the sink material when the laser is on. In these embodiments, sink material may still be utilized to protect the sensitive optical element during shipment and when access to reliable electrical power is limited and when the ovens are off. However, prior to activating the laser, sink material is removed from container 50 (see FIG. 2) through access port 220 (see FIG. 2) once the oven is turned off. When an operator turns the laser off, sink material may be re-inserted and the oven turned off.

Figure 5:
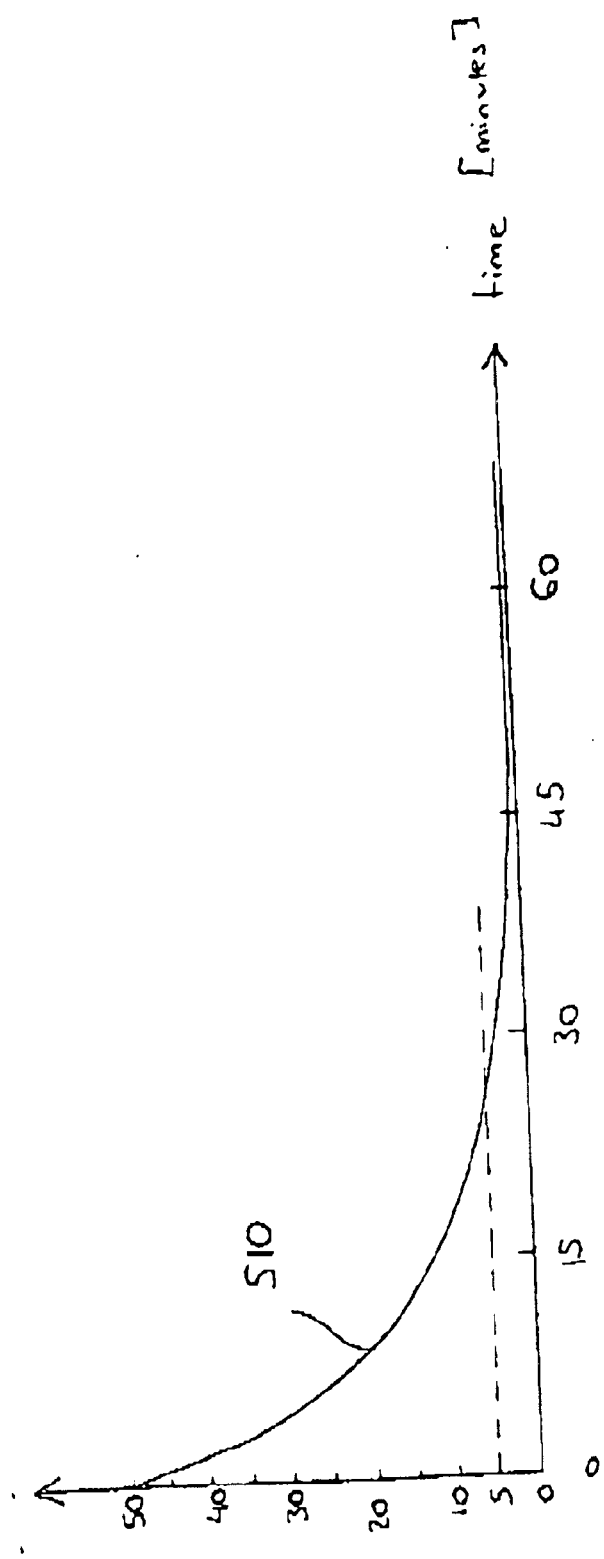
FIG. 5 is a graph illustrating a typical time history for reducing relative humidity.

FIG. 5 illustrates a typical time history for reducing relative humidity. In FIG. 5, the measured relative humidity [%] in the interior volume 20 (see FIG. 1) is shown versus time [min.] by curve 510. The particular embodiment of the apparatus used for the test included molecular sieve as sink material in six sub-container bags located in container 50 (see FIG. 1). The total mass of sink material was 18 g. According to the curve 510, the relative humidity was reduced from about 50% to less than 5% in less than 30 min. Allowed to remain for a long time, the relative humidity remained at less than 2% for at least 180 days, even in the presence of large external temperature range between -40 C and 60 C.

FIG. 6 shows yet another embodiment of the system and method of the invention wherein the optical housing 600 comprises a laser system contained within enclosure 610. The laser system is indicated generically as comprising gain material 648, Q-Switch 640 contained within cell 645 and suitable feedback optics 620 and 622. In this case the Q-Switch material may comprise a sensitive optical material. In one common example, the laser 600 is a solid state laser such as erbium-doped YAG having a beam 630 emitting radiation near 3 mm, a wavelength known to be strongly absorbed by water. This can result in damage to the coated surfaces of a sensitive electro/optic crystal such as LiNbO3. The sink material 680 contained in container 650 behind gas-permeable surface 660 allows the rapid removal of humidity, promoting long life operation of this type of laser.

As is readily apparent to a skilled person, the invention is not limited to the above-described embodiments. Rather, different configurations and embodiments can be developed without departing from the scope of the invention and are intended to be included within the scope of the claims set forth below.

What is claimed is:

1. An optics housing, comprising:
   an enclosure with an interior volume and configured to be substantially sealed against an external atmosphere;
   an optical element positioned in the interior volume, the optical element including material having at least one physical characteristic that varies with exposure to at least one constituent of the external atmosphere;
   a container coupled to the housing and including a gas-permeable surface; and
   a sink material disposed within the container, the sink material having a characteristic of absorbing said at least one constituent;
   wherein at least a portion of the gas permeable surface is substantially opaque to optical radiation.

2. The optics housing of claim 1, has optical radiation that illuminates some or all of interior volume.

3. The optics housing of claim 1, wherein the portion of the gas-permeable surface that is substantially opaque to light includes a woven mesh material.

4. The optics housing of claim 3, wherein the woven mesh material has mesh pores, the mesh pores having a pore dimension of about one micrometer.

5. The optics housing of claim 1, wherein the gas-permeable surface material is perforated metal.

6. The optics housing of claim 1, wherein the gas permeable surface material is a porous medium.

7. The optics housing of claim 1, wherein the optical element includes at least one material selected from CLBO, CD*A, LBO, BBO, KDP, KD*P, $LiNbO_3$, $CaF_2$, and $MgF_2$.

8. The optics housing of claim 1, wherein the sink material includes at least one material selected from a molecular sieve, silica gel, activated illumina, and activated charcoal.

9. The optics housing of claim 1, wherein the sink material is confined in at least one sub-container.

10. The optics housing of claim 1, wherein the at least one constituent of the external atmosphere includes water vapor.

11. The optics housing of claim 1, wherein the container is coupled to the enclosure to form a protuberance that extends into the interior volume of the enclosure.

12. An optics housing, comprising:
an enclosure with an interior volume, the enclosure adaptable to be substantially sealed against an external atmosphere;
an optical element disposed within the interior volume, wherein the optical element contains material having at least one physical characteristic that varies with exposure to at least one constituent of the external atmosphere;
a container coupled to the enclosure, wherein the container includes a gas-permeable mesh surface area with a ratio of no less than 0.1 to a total interior surface of the container; and
a sink material disposed within the container, wherein the sink material has a characteristic of spontaneously absorbing said at least one constituent.

13. The optics housing of claim 12, wherein the ratio of the gas permeable surface area to an interior surface area of the enclosure is no less than about 0.3.

14. An optics housing, comprising:
an enclosure with an interior volume area, the enclosure adaptable to be substantially sealed against an external atmosphere;
an optical element disposed within the interior volume, wherein the optical element contains material having at least one physical characteristic that varies with exposure to at least one constituent of the external atmosphere;
a container having a gas-permeable surface and a gas impermeable access port to a container interior, the container coupled to the housing so as to form a protuberance that extends into an interior volume of the housing with the gas impermeable access port being a portion of an optics housing exterior; and
a sink material disposed within the container, wherein the sink material has a characteristic of absorbing said at least one constituent.

15. The optics housing of claim 14, wherein the access port includes an observation window.

16. The optics housing of claim 15, wherein the observation window includes a spectral filter.

17. A laser system, comprising:
a laser;
an enclosure adaptable to be substantially sealed against an external atmosphere and is configurable to receive a laser beam from the laser and emit optical radiation as an output;
an optical element disposed within an interior volume of the enclosure, wherein the optical element contains material having at least one physical characteristic that varies with exposure to at least one constituent;
a container having a gas-permeable surface and coupled to the enclosure; and
a sink material disposed within the container, wherein the sink material has a characteristic of spontaneously absorbing of said at least one constituent;
wherein said container is structured so that said sink material is removable from said container without opening the enclosure and exposing the interior volume.

18. The laser system of claim 17, wherein the laser system generates ultraviolet radiation.

19. The laser system of claim 17, wherein the laser system generates radiation that overlaps in wavelength with transitions contained in the set of transition selected from electronic transitions of $H_2O$ and rotation-vibration transitions of $H_2O$.

20. The laser system of claim 17, wherein at least a portion of the gas permeable surface is substantially opaque to optical radiation.

21. The laser system of claim 17, wherein the gas-permeable surface is a woven mesh that is substantially opaque to light.

22. The laser system of claim 17, wherein the optical element includes at least one material contained in the set of materials selected from CLBO, CD*A, LBO, BBO, KDP, KD*P, $LiNbO_3$, $CaF_2$, and $MgF_2$.

23. The laser system of claim 17, wherein the sink material includes at least one material contained in the set of materials selected from a molecular sieve, silica gel, activated illumina, and activated charcoal.

24. An optics housing, comprising:
an enclosure with an interior volume and an interior surface area, the enclosure adaptable to be substantially sealed against an external atmosphere;
wherein at least a portion of said interior volume being subject to illumination having an optical power density;
an optical element disposed within the interior volume, wherein the optical element contains material having at least one physical characteristic that varies with exposure to at least one constituent of the external atmosphere; and
a sink material within the interior volume, the sink material having a characteristic of spontaneously absorbing of at least one gas species;
an isolator member for isolating the sink material from said optical power density.

25. The optics housing of claim 24, wherein said isolator member comprises a bag at least partially made of woven mesh material.

26. The optics housing of claim 24, wherein the optical element includes at least one material contained in the set of materials selected from CLBO, CD*A, LBO, BBO, KDP, KD*P, $LiNbO_3$, $CaF_2$, and $MgF_2$.

27. The optics housing of claim 24, wherein the sink material includes at least one material contained in the set of materials selected from a molecular sieve, silica gel, activated illumina, and activated charcoal.

28. A laser system, comprising:
an enclosure with an interior volume and an interior surface area, the enclosure adaptable to be substantially sealed against an external atmosphere;
a laser positioned in the interior volume;
an optical element disposed within the interior volume, wherein the optical element contains material having at least one physical characteristic that varies with exposure to at least one constituent of the external atmosphere; and
a sink material within the interior volume, the sink material having a characteristic of spontaneously absorbing of at least one gas species;
wherein the laser system generates radiation at a wavelength that is strongly absorbed in $H_2O$;
a container housing said sink material and protecting said sink material from exposure to said radiation.

29. The laser system of claim 28, wherein the laser system generates ultraviolet radiation.

30. The laser system of claim 28, wherein the enclosure includes an interior atmosphere.

31. The laser system of claim 28, wherein the optical element includes at least one material contained in the set of materials selected from CLBO, CD*A, LBO, BBO, KDP, KDP, $LiNbO_3$ $CaF_2$, and $MgF_2$.

32. The laser system of claim 28, wherein the sink material includes at least one material contained in the set of materials selected from a molecular sieve, silica gel, activated illumina, and activated charcoal.

33. A method for protecting sensitive optical elements in situ, comprising:
  providing an enclosure with an interior volume, the enclosure adapted to be substantially sealed against an external atmosphere wherein at least a portion of said interior volume being subject to illumination;
  disposing an optical element within the interior volume, the optical element including material having at least one physical or optical characteristic that varies with exposure to at least one constituent;
  providing sink material coupled to the enclosure; and
  trapping said at least one constituent in the sink material by a sorption process;
  isolating the sink material from said illumination;
  wherein the sink material is sufficient to reduce a relative humidity in the interior volume from 50% to less than about 5% in less than 30 min.

34. The method of claim 33, further comprising removing the sink material through an access port prior to exposing the optical element to laser radiation.

35. The method of claim 33, isolating said sink material from said illumination using a bag comprising a woven mesh material.

36. The method of claim 33, further comprising mitigating aerosol production by enclosing the sink material in a sub-container.

37. The method of claim 33, further comprising mitigating out-gassing by enclosing the sink material in a sub-container.

38. The method of claim 33, wherein the at least one constituent trapped in the sink material includes $H_2O$.

39. The method of claim 38, wherein a relative humidity in the interior volume is reduced to less than about 5% in less than 120 min.

40. The method of claim 38, wherein a relative humidity in the interior volume is reduced to less than about 5% in less than 30 min.

41. The method of claim 38, wherein a relative humidity in the interior chamber is maintained to less than 5% for at least 30 days.

42. The method of claim 38, wherein a relative humidity in the interior chamber is maintained to less than 2% for at least 30 days.

43. The method of claim 38, wherein a relative humidity in the interior chamber is maintained to less than 2% for at least 180 days.

44. The method of claim 33, further comprising providing a heating element coupled to the enclosure, in addition to the sink material, for removing contaminants.

45. A method comprising:
  providing an enclosure having an interior volume and an optical element within the interior volume, the optical element including material having at least one physical or optical characteristic that varies with exposure to at least one constituent;
  using a sink material in a container to absorb said constituent, said container having a gas permeable area sized to allow said sink material to lower a relative concentration of said at least one constituent at a rate sufficiently fast to avoid damage to said optical element.

46. The method of claim 45, wherein said at least one constituent is water vapor.

47. The method of claim 45, wherein said container includes a fully permeable surface area with a ratio of no less than 0.1 to an interior surface of the enclosure.

48. The method of claim 45, wherein said container includes a fully permeable surface area with a ratio of no less than 0.3 to an interior surface of the enclosure.

49. The method of claim 45, wherein a rate of change of a concentration level of said constituent changes by an order of magnitude in less than an hour.

50. The method of claim 45, wherein a rate of change of the contaminant is of sufficient rate to prevent damage due to condensation.

51. The device of claim 1, wherein the enclosure has an internal atmosphere.

52. The device of claim 1, wherein the constituent is in a gaseous form.

53. The laser system of claim 17, wherein the enclosure has an internal atmosphere.

54. The laser system of claim 20, wherein said optical radiation is generated by a laser.

55. The laser system of claim 21, wherein said light is generated by a laser.

56. The optics housing of claim 24, wherein the enclosure has an internal atmosphere.

57. The method of claim 33, wherein the enclosure has an internal atmosphere.

58. A laser system, comprising:
  an enclosure with an interior volume and an internal atmosphere, wherein at least a portion of said interior volume being subject to illumination;
  an optical element positioned in the interior volume, the optical element including material having at least one physical characteristic that varies with exposure to at least one constituent;
  a container coupled to to the housing and including a gas-permeable surface; and
  a sink material disposed within the container, the sink material having a characteristic of absorbing said at least one constituent;
  wherein said container is configured to prevent said illumination from deteriorating the sink material while said container remains gas permeable.

59. A laser system as in claim 58 wherein said container has pore dimensions of one micrometer or less.

* * * * *